Figure 1:
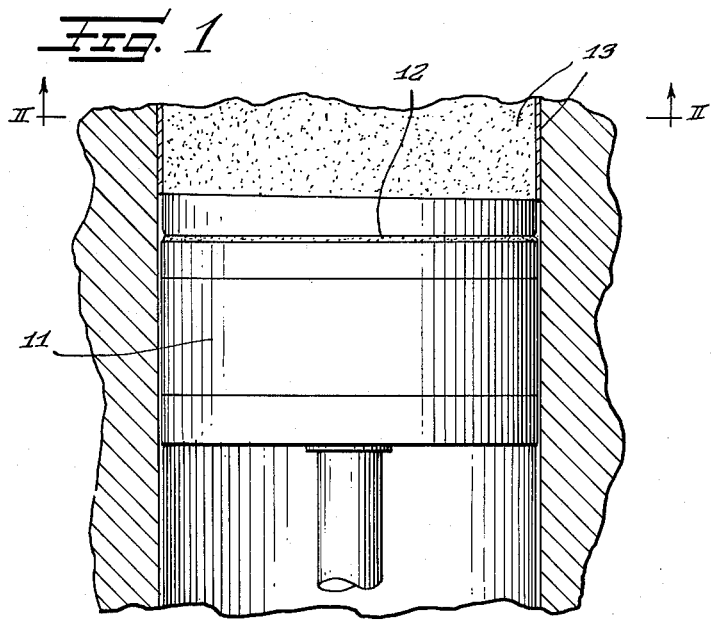

April 4, 1961   S. W. BRADSTREET ET AL   2,978,360
COMBUSTION CATALYSIS
Filed March 26, 1959

INVENTOR.
*Samuel W. Bradstreet*
*Harold L. Rechter*

United States Patent Office 2,978,360
Patented Apr. 4, 1961

2,978,360
COMBUSTION CATALYSIS

Samuel W. Bradstreet, Oak Park, and Harold L. Rechter, Chicago, Ill., assignors to Armour Research Foundation of Illinois Institute of Technology, Chicago, Ill., a corporation of Illinois Filed Mar. 26, 1959, Ser. No. 802,134

19 Claims. (Cl. 117—104)

The present invention relates to combustion catalysis, and more particularly, relates to a method whereby combustion chambers and the components thereof are provided with a catalytic coating in order to maximize combustion therein. Our invention also relates to the compositions which form such catalytic coatings, and to the coated articles produced in accord herewith. As is evident from the following detailed disclosure, although our invention provides considerable improvements when used in internal combustion engines—gasoline or diesel—its applicability is not limited merely to such engines. It further should be apparent that the coatings of the instant invention not only present beneficial features from a catalytic standpoint, but further, that they provide excellent heat insulation characteristics.

As background to our invention and particularly to the aspect thereof which relates to its use with internal combustion engines, it should be recalled that such engines convert the energy of burning fuel into mechanical motion. The efficiency with which such conversion is accomplished largely depends upon the rate and extent to which combustion proceeds, and until recently such efficiency question has been the prime reason for efforts directed toward assuring more complete combustion. The obvious objective of maximizing engine efficiency has recently been overshadowed by the demand to reduce the noxious and corrosive waste gases eminating from such engines, particularly those of the piston type. It is known that in many instances, hydrocarbon fuels instead of being completely oxidized to carbon dioxide and water are oftentimes incompletely combusted to carbon monoxide, or merely pyrolyzed to coke-like solids which foul the combustion chamber and exhaust system, or form various other noxious hydrocarbon molecules. Although it has not been conclusively proven, the exhaust of such incomplete combustion products apparently gives rise in part to the acrid smog found in some metropolitan areas. It is to the prevention of such incomplete combustion and degradation that our invention is primarily directed. With this prime reason in view, it should also be understood that the coatings of some embodiments of the instant invention likewise provide thermal insulation in addition to their catalytic properties to further increase engine efficiency.

Accordingly, a general object of our invention is to provide a novel, crystalline ceramic coating composition which has catalytic properties.

Another object of our invention is to provide a novel process for depositing crystalline, ceramic coatings having excellent catalytic and thermal insulative properties.

A further object of our invention is to provide a crystalline, ceramic coating upon the internal surface of a combustion chamber.

A more specific object of our invention is to provide a piston for use in an internal combustion engine, the non-rubbing, head surfaces of which are coated with a catalytic ceramic coating.

A further, more specific object of our invention is to provide a ceramic oxide-lined combustion chamber for use with a gaseous gasoline, or diesel fuel which coating has both insulative and catalytic properties.

Still a further object of our invention is to provide novel catalytic means.

Figure 2:
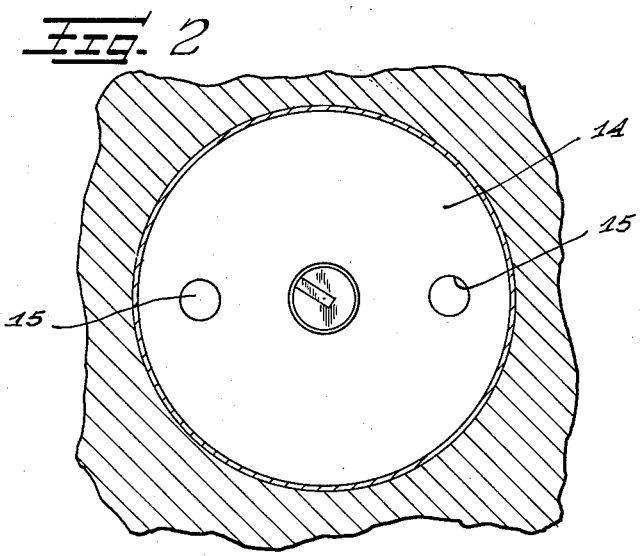

Other objects, features and advantages of the instant invention will become apparent to those skilled in this particular art from the following detailed disclosure thereof particularly when taken in conjunction with the accompanying drawings in which:

Figure 1 discloses an internal combustion engine cylinder and piston coated in accord with the teachings of the instant invention; and Figure 2 is a view along line II—II of Figure 1.

The foregoing and other objects of the instant invention are accomplished through a process known as "Flame Spraying" in the preferred embodiment hereof or by other similar processes whereby specific catalytic compositions are fed either through a flame or in some instances a heated zone and such flame or zone with entrained ceramic oxide material is then directed onto the surface sought to be coated or by other ceramic deposition processes. Such processes are elaborated upon in greater detail in connection with the specific compositions that are useful in the practice of our invention.

In the deposition of a crystalline, ceramic coating by flame spraying it is desirable that one or more of the powdered substances fed into the flame (or heated zone) act as a combustion catalyst. Such a material is one which will enhance the flame reaction upon the surface of such substance thereby increasing the rate at which such surface is heated by the flame. A variety of such catalytic materials have been used and some of them (titanium oxide, or aluminum oxide containing small amounts of titanium oxide, silicon dioxide, lithium oxide, vanadium or niobium oxides and the like) continue to be moderately good flame catalysts after the coating is formed.

For the specific purpose of catalyzing combustion reactions, however, it is desirable that the maximum degree of catalytic activity be combined with a high degree of thermal stability. This criterion of thermal stability requires that the coating be refractory (i.e., that its fusion temperature be high) and also stable (i.e., that it be chemically unchanged after contact with the combustion gases and their products). Titanium oxide, for instance in the rutile form is an excellent oxidation catalyst provided that it has an oxygen deficient structure as for example, the type obtained in most combustion systems at or above about 1400° C.; at lower temperatures the material becomes stoichiometric $TiO_2$ and loses much of its catalytic effect. Copper suboxides and copper chromite on the other hand, form inert structures at moderate temperatures (around 500° C.) and cannot therefore be used as catalysts above such temperatures.

The catalytic qualities of the coatings of the instant invention are provided by materials selected from the class consisting of cerium oxide ($CeO_2$), neodymium oxide ($Nd_2O_3$), praseodymium oxide ($Pr_6O_{11}$) and mixtures thereof. Such rare earth oxides are preferred components of the flame spray feed composition if the beneficial results of our invention are to be realized.

We have also found that flame catalysts selected from the group comprising lanthanum oxide ($La_2O_3$), scandium oxide ($Sc_2O_3$), yttrium oxide ($Y_2O_3$), aluminum oxide ($Al_2O_3$) and mixtures thereof may be combined with the aforementioned rare earth oxides to reduce the temperature necessary for coating deposition. More specifically, the instant coatings are applied by bringing the ceramic oxide particles to their sintering temperature either in the flame or in the heated zone of a similar apparatus. Such flame catalysts act to lower the sintering temperature of the particular aforementioned rare earth oxides.

In addition to such above enumerated flame catalysts another series of oxides, which while strictly speaking do not act to lower the temperature necessary for sintering of the rare earth oxides, still as a practical matter act to lower such sintering temperatures by forming solid solutions therewith. Such latter solid solution formers are selected from the group comprising niobium oxide ($Nb_2O_5$), tantalum oxide ($Ta_2O_5$), vanadium oxide ($V_2O_5$), and mixtures thereof. It is thus possible in the practice of our invention to either use the rare earth oxides alone or in combination with one or both of the flame catalysts or the solid solution forming compounds.

Such compounds and mixtures are preferably utilized by flame spraying them onto the substrate surface. In the preferable embodiment of our process an oxy-hydrogen flame is used although it should be clearly understood that we can make use of an oxy-acetylene flame and related apparatus. Oxy-hydrogen torches are well known and a variety of such devices may be used herewith. In brief, such torches have an oxygen stream inlet and an hydrogen inlet stream which join near the flame orifice. In our process, the catalytic oxides and the flame catalysts and/or solid solution formers are directed into the flame entrained in the stream.

The substrates selected for use with the instant invention must be able to withstand the momentary heat of the flame but this usually does not present a problem since in most instances metals are used as the substrate materials. It should be clearly understood that in our process it is unnecessary and in fact in most instances undesirable to soften or fuse the subtrate surface in order to effect coating adherence. As the oxide particles pass through the flame they are brought to their sintering temperature and upon impingement upon the substrate are caused to strongly adhere thereto as a crystalline ceramic coating. It is likewise unnecessary and again in many instances undesirable to bring the oxide particles to their melting temperature for in this instance a vitreous coating may be formed which lacks the catalytic properties of the instant crystalline coatings.

Even more specifically, in order to provide the instant coatings by the use of the oxy-hydrogen torch system the following example may be practiced. Such torch has a burning tip of approximately 5/32 of an inch inside diameter. Gas flow rates are maintained at 50 to 75 cubic feet per hour of oxygen and from 100 to 150 cubic feet per hour of hydrogen. Powdered oxide (approximately —325 mesh) selected from the aforementioned materials are entrained in the oxygen stream and directed through the oxy-hydrogen flame onto the surface to be coated. The flame is held from 1½ inches to four inches from such surface and is positioned at nearly normal thereto. Such flame should be moved during spraying to avoid local heating stresses and to insure an even deposition of coating thickness.

Illustrative of a few specific compositions which may be flame sprayed to provide the instant catalytic and thermal insulation coatings are the following examples:

Example I

| | Percent |
|---|---|
| Cerium oxide | 45.0 |
| Lanthanum oxide | 22.5 |
| Neodymium oxide | 17.9 |
| Praseodymium oxide | 5.7 |
| Thorium oxide | 0.25 |
| Sulfate as $SO_3$ | 1.5 |
| Other oxides ($Y_2O_3$, $Sc_2O_3$) | 2.9 |
| Phosphate as $P_2O_5$ | 0.8 |
| Lime and magnesia | 1.0 |

Example II*

| | Percent |
|---|---|
| Cerium oxide | 90.0 |
| Lanthanum oxide | 2.0 |
| Neodymium oxide | 1.3 |
| Praseodymium oxide | 0.4 |
| Other rare earth oxides | 1.0 |
| Thorium oxide | 0.25 |
| Iron oxide and alumina | 0.25 |
| Lime and magnesia | 4.0 |
| Silica | 0.05 |
| Phosphate | 0.5 |
| Sulfate | 0.5 |

* Sold commercially under the trade name "Cerox" by Lindsay Chemical Company.

Example III [1]

| | Percent |
|---|---|
| Cerium oxide | 45.6 |
| Lanthanum oxide | 22.8 |
| Neodymium oxide | 16.2 |
| Praseodymium oxide | 4.7 |
| Other rare earth oxides | 5.7 |
| Thorium oxide | 0.2 |
| Iron oxide and alumina | 1.0 |
| Lime and magnesia | 0.2 |
| Silica | 0.1 |
| Phosphate | 0.5 |
| Sulfate | 1–2.0 |
| Loss on ignition | 0–1.0 |

[1] Sold commercially under the trade name "Code 330" by Lindsay Chemical Company.

All of the foregoing percentages are by weight.

In even more general terms, it should be understood that the compositions used for flame spraying or the like should contain as high a percentage of ceria ($CeO_2$) as can be readily and economically achieved, this in view of the practical difficulties involved in separating the various rare earth oxides. Specifically, the ceria content, by weight in the flame spray mixture may vary from 30% up to practically 100%. The praseodymium oxide is a desirable additive to the ceria, since it is in itself an oxidation catalyst, and may range in amounts of from a mere trace (i.e., about 0.01%) up to 20.0%. This is likewise true of the neodymium oxide, and the content thereof in the mixture may also range from 0.01 to 20.0%.

We have found, on the other hand, that the amount of lanthanum oxide (e.g., $La_2O_3$) should be maintained at a minimum in order to obtain a more stable coating from both the physical and chemical standpoint. Again referring to the commonly known difficulties of separating the rare earth oxide along with the economics of the problem, catalytically operative coatings may be formed by the practice of the instant process by utilizing from 0 to 25% $La_2O_3$, but in the preferred embodiments hereof the lanthana content of the mixture approaches the lower limits of the range.

The inclusion of thoria in the flame sprayed coatings is beneficial, chiefly as a result of the interesting phenomena of expansion of the crystal lattice of $CeO_2$ or $Pr_2O_3$ whereby more defect structures are produced in such latter materials to yield more efficient catalytic activity.

For flame spraying purposes the particle size of the foregoing materials may range from —60 mesh down to as low as 0.5 micron, with the size of —325 representing the preferred embodiment.

The foregoing powdered material of Example I at 60 mesh was passed through the flame of an oxy-hydrogen torch and more specifically was carried within the oxygen stream thereof and was directed onto the top surface of an internal combustion piston head as shown in Figure 1. In such figure the piston 11 has the catalytic ceramic coating applied to the non-rubbing head surface 12 thereof. Such coating was somewhat granular and was red-brown in color when hot but turned to a yellowish-tan after cooling, such being probably due to the yellow color changes of ceria and the reoxidation of small amounts of didymia carried therein. This coating was quite adherent despite thermal cycling to 1200° F. and was highly heat insulative.

Briefly referring to the various other components illustrated in the herein attached drawings, it is likewise seen that not only is the top surface of the piston 11 provided in accord herewith with a catalytic surface coating 12, but also that the areas on the side and top internal walls of the cylinder 13 and 14, which are not in contact with the piston are likewise thus coated. The coating may also be applied to the valves 15.

Pistons, some of which were flame spray coated with the composition of example I were then used in the following tests:

A used, 216-inch Chevrolet engine, fueled with unleaded gasoline was used for the evaluation run. Three test series were performed as follows:
 (1) An engine with coated pistons.
 (2) An engine with coated pistons and an air-bleed.
 (3) An engine with uncoated pistons and air-bleed.
Such air-bleed is a device which replaces the intake gasket and modifies the fuel-air ratio by a fixed amount.

Exahust samples from such engines were obtained under the following operating conditions:
 (1) Idling at 500 r.p.m.
 (2) Cruising at 1000 and 2650 r.p.m.
 (3) Deceleration (closed throttle) from 2650 r.p.m. to 600 r.p.m.
 (4) Acceleration (full open throttle) from 600 to 2650 r.p.m.

Tables 1, 2, 3 and 4 litsed below present the operating data for such trial runs. Gas analyses were obtained by vapor phase chromatography and an analyses of unburned hydrocarbons were obtained from infrared spectra. Methane and water were not separately determined.

TABLE I

*Engine operating data and exhaust gas analyses coated pistons*

| Condition | Idle | Cruise | | Accelerate | | | Decelerate | | |
|---|---|---|---|---|---|---|---|---|---|
| Speed............r.p.m.. | 500 | 1,000 | 2,650 | 600 | 1,500 | 2,650 | 2,650 | 1,500 | 600 |
| Load............lb.. | | 10.5 | 34 | 6.5 | 14.5 | 34.5 | 34 | 14 | 6 |
| Power............hp.. | idle | 5.0 | 45 | 1.9 | 10.9 | 45.7 | 45 | 10.5 | 1.8 |
| Intake vacuum......in. Hg.. | 14.5 | 15.1 | 7.4 | 0 | 0.5 | 1.5 | 25.3 | 25.5 | 21.9 |
| Outlet pressure......in. H₂O.. | 0.45 | 4.5 | | 14 | 22.5 | 56.5 | 0.2 | 0.2 | 0.2 |
| Outlet temp..........° F.. | 515 | 665 | | 665 | 960 | 1,260 | 1,180 | 595 | 470 |
| Nitrogen........vol. percent.. | 78.1 | 77.6 | 81.0 | 77.9 | 80.5 | 80.0 | 77.1 | 80.5 | 77.0 |
| Oxygen............do.... | 2.13 | 1.43 | 1.34 | 1.55 | 1.13 | 1.30 | 1.51 | 12.3 | 20.9 |
| Carbon dioxide.......do.... | 9.91 | 8.44 | 14.48 | 14.8 | 12.1 | 13.3 | 13.18 | 4.28 | 0.38 |
| Carbon monoxide......do.... | 9.3 | 12.35 | 2.87 | 5.72 | 6.03 | 4.9 | 6.06 | 2.26 | |
| Total............do.... | 99.44 | 99.82 | 99.69 | 99.97 | 99.76 | 97.50 | 97.85 | 99.34 | 98.28 |
| Acetylene..........p.p.m.. | 311 | 388 | none | 136 | 175 | | 304 | 395 | 675 |
| Ethylene..........p.p.m.. | 221 | 481 | none | 88 | 131 | | 367 | 304 | 88 |
| Propane..........p.p.m.. | | | | | 132 | 396 | | | |
| Isobutane..........p.p.m.. | | | | | | 118 | | | |
| Butane............p.p.m.. | | | | | | | | | |
| Hexane............p.p.m.. | 221 | 149 | none | 192 | 177 | | 752 | 3,360 | 885 |

TABLE II

*Engine operating data and exhaust gas analyses, coated pistons and air bleed*

| Condition | Idle | Cruise | | Accelerate | | | Decelerate | | |
|---|---|---|---|---|---|---|---|---|---|
| Speed............r.p.m.. | 600 | 1,000 | 2,650 | 600 | 1,500 | 2,650 | 2,650 | 1,500 | 600 |
| Load............lb.. | idle | 10 | 34 | 6.5 | 14 | 34 | 34 | 14 | 65 |
| Power............hp.. | | 5.0 | 45 | 1.9 | 10.5 | 45 | 45 | 10.5 | 1.9 |
| Intake vacuum......in. Hg.. | 17.6 | 14.7 | 8.9 | 0.2 | 0.8 | 2.6 | 25.0 | 25.2 | 21.5 |
| Outlet pressure......in. H₂O.. | 0.2 | 4.7 | 29.2 | 5.6 | 21.3 | 50.3 | 0.3 | 0.2 | 0.2 |
| Outlet temp..........° F.. | 395 | 665 | 1,245 | 660 | 940 | 1,260 | 1,150 | 590 | 370 |
| Nitrogen........vol. percent.. | 78.6 | 78.4 | 80.7 | 79.1 | 80.3 | 80.2 | 77.8 | 79.1 | 76.9 |
| Oxygen............do.... | 2.04 | 1.32 | 1.38 | 1.34 | 1.22 | 2.57 | 3.21 | 15.45 | 17.7 |
| Carbon dioxide.......do.... | 10.11 | 9.04 | 14.85 | 12.11 | 12.9 | 11.95 | 11.16 | 2.43 | 1.63 |
| Carbon monoxide......do.... | 9.03 | 11.16 | 2.97 | 7.28 | 5.51 | 5.26 | 4.92 | 1.07 | 1.80 |
| Total............do.... | 99.78 | 99.92 | 99.90 | 99.83 | 99.93 | 99.98 | 97.09 | 98.05 | 98.03 |
| Acetylene..........p.p.m.. | 225 | 119 | | 99 | 898 | n.d. | none | 1,525 | 290 |
| Ethylene..........p.p.m.. | | 177 | | 109 | 164 | n.d. | 495 | 521 | 251 |
| Propane..........p.p.m.. | | | | | | | 1,280 | 230 | 594 |
| Isobutane..........p.p.m.. | | | | | | | 739 | 924 | 481 |
| Butane............p.p.m.. | | | | | | | 796 | 793 | 594 |
| Hexane............p.p.m.. | | 204 | | 133 | 248 | | 21,800 | 552 | 221 |
| Probable hydrocarbons percent.. | 0.22 | 0.08 | 0.10 | 0.17 | 0.07 | 0.02 | 2.91 | 1.95 | 1.97 |

NOTE.—After runs A and B, engine was reassembled with duplicate uncoated pistons. On four of six pistons which had been coated, peripheral coating loss (scaling) was observed, with no change in coating thickness.

TABLE III

*Engine operating data and exhaust gas analyses, uncoated pistons and air bleed*

| Condition | Idle | Cruise | | Accelerate | | | Decelerate | | |
|---|---|---|---|---|---|---|---|---|---|
| Speed..................r.p.m.. | 500 | 1,000 | 2,650 | 600 | 1,500 | 2,650 | 2,650 | 1,500 | 600 |
| Load...................lb.. | idle | 10 | 34 | 6.5 | 14 | 34 | 34 | 14 | 6 |
| Power..................hp.. | | 5.0 | 45 | 1.9 | 10.5 | 45 | 45 | 10.5 | 1.8 |
| Intake vacuum.........in. Hg.. | 14.25 | 11.5 | 4.5 | 0.2 | 0.8 | 2.6 | 24.7 | 25.3 | 20.8 |
| Outlet pressure.......in. $H_2O$.. | 0.2 | 3.4 | 45 | 5.6 | 21.3 | 50.3 | 0.6 | 0.2 | 0 |
| Outlet temp............° F.. | 605 | 705 | 1,305 | 660 | 940 | 1,260 | 1,080 | 710 | 505 |
| Nitrogen..............percent.. | 78.2 | 77.4 | 80.6 | 78.6 | 79.4 | 79.8 | 74.5 | 78.6 | 76.6 |
| Oxygen..................do.... | 2.36 | 1.61 | 1.34 | 1.57 | 1.21 | 1.29 | 1.22 | 13.92 | 16.4 |
| Carbon dioxide..........do.... | 10.38 | 8.32 | 14.83 | 10.68 | 12.2 | 13.58 | 12.25 | 3.84 | 2.12 |
| Carbon monoxide.........do.... | 8.82 | 12.5 | 3.0 | 8.88 | 6.97 | 5.17 | 9.04 | 1.85 | 2.98 |
| Total..................do.... | 99.76 | 99.83 | 99.77 | 99.73 | 99.78 | 99.84 | 97.01 | 98.21 | 98.10 |
| Acetylene.............p.p.m.. | 262 | 122 | n.d. | | | | | | |
| Ethylene..............p.p.m.. | | | | | | | | | |
| Propane...............p.p.m.. | | | | | 151 | | | | 561 |
| Isobutane.............p.p.m.. | | | | | 196 | | | | 120 |
| Butane................p.p.m.. | | | | | | | | | 860 |
| Hexane................p.p.m.. | | | | | | | 284 | 110 | |
| Probable hydrocarbons percent.. | 0.24 | 0.17 | 0.23 | 0.27 | 0.22 | 0.16 | 2.99 | 1.79 | 1.90 |

TABLE IV

*Comparison of combustion products for coated vs. uncoated pistons*

| Condition | Percent CO | | | Percent $C_xH_y$ | | |
|---|---|---|---|---|---|---|
| | Uncoated | Coated | ratio | Uncoated | Coated | ratio |
| Idle........................ | 8.82 | 9.03 | 1.02 | 0.24 | 0.22 | .92 |
| Cruise (1,000 r.p.m., 23 m.p.h.)........... | 12.5 | 11.16 | .89 | 0.17 | 0.08 | .47 |
| Cruise (2,650 r.p.m., 60 m.p.h.)........... | 3.0 | 2.97 | .99 | 0.23 | 0.10 | .43 |
| Accelerate: | | | | | | |
| 0–14 m.p.h............ | 8.88 | 7.28 | .82 | 0.27 | 0.17 | .63 |
| 14–30 m.p.h........... | 6.97 | 5.51 | .79 | 0.22 | 0.07 | .31 |
| 30–60 m.p.h........... | 5.17 | 5.26 | .98 | 0.16 | 0.02 | .12 |
| Decelerate: | | | | | | |
| 60–23 m.p.h........... | 9.04 | 4.92 | .54 | 2.99 | 2.91 | .97 |
| 23–14 m.p.h........... | 1.85 | 1.07 | .58 | 1.79 | 1.95 | 1.09 |
| 14–0 m.p.h............ | 2.98 | 1.80 | .60 | 1.90 | 1.97 | 1.04 |

We think it evident to those skilled in this art from the foregoing charts that the instant invention has particular applicability in the reduction of noxious exhaust gases from internal combustion engines, and furthermore that such coatings may be utilized in a variety of combustion and oxidation catalyst processes.

In another utilization of our invention a coating was formed by flame spraying Example I upon one side of a rectangular sheet of stainless steel or other similar heat resistant metal. This was enclosed within a gas tight chamber provided with inlets for fuel (gas or atomized liquid) and air or oxygen and was so constructed that the fuel stream impinged upon the surface of the metal, and an exhaust port was provided to regulate pressures within the chamber. The metal plate was heated by its own electrical resistance and its temperature measured by a thermocouple; the temperature of the coating was measured optically through a sighting port. As the temperature of the plate was increased combustion occurred and it was evidenced by sudden rise in coating (and exhaust gas) temperatures. A similar test was made with an uncoated plate to show that combustion begins at a significantly lower temperature (15–50° C.) upon such coating than upon the uncoated plate, even when insufficient oxygen was present to provide complete combustion.

Still more evidence of catalyst activity was provided by the diminution of carbon deposits in internal combustion engines whose pistons or cylinder heads were coated with the instant material. In this case too, the thermal insulation provided by the coating is advantageous in that carbon deposits are less apt to condense upon a heated surface. However, that this effect is not solely one of insulation is shown when an equally insulative, but non-catalytic zirconium oxide coating is used; in this case carbon deposition is little effected by the presence of the coating.

For internal combustion engines, whether of the reciprocal or tubine type the coating should be one which is an effective catalyst at as low a temperature as possible. For other purposes (burner tubes, heat exchanger walls, turbines and ram jet engines) it is more important that the coating material be chemically inert.

While the mechanism of oxidation catalysis is not completely understood, the inventors hereof have found the following theory may be useful in predicting the catalytic activity of solid crystalline materials and coatings: the action of a catalyst is measured by its ability to react reversibly with both the fuel used and the oxygen.

It is further required that these reversible surface reactions do not irreversibly change the catalytic material and that the energy required to absorb or release the pure oxygen be quite small.

If cerium oxide is used as an example of the catalyst, hydrogen as the fuel and oxygen as the oxidant, the reactions which occur are as follows: in a flame the reaction $$H_2 + \tfrac{1}{2}O_2 \rightarrow H_2O$$

occurs irreversibly although the side reaction $$H_2O \rightarrow H^+ + OH^-$$

tends to move toward the right at high temperatures.

Cerium oxide normally exists in the "Fluorite" lattice structure, each cerium oxide being equidistantly surrounded by eight oxygen ions in the corners of a cube, while each oxygen ion is surrounded by four cerium ions at the corners of a regular tetrahedron. In this normal state each cerium ion is quadravalent.

Cerium can also exist in several valences; however $Ce_2O_3$, in which the cerium is trivalent, has a normal crystal lattice which the cerium ions lie near the center of a distorted octahedron of regular oxygen ions, a seventh oxygen ion above one of the octahedral faces. In this "a $M_2O_3$" lattice the distance between cerium and oxygen ions is not always the same and the lattice therefore represents different bonding energies. A similar lattice exists for the sesqui-oxides of manganese, lanthanum, praseodymium and neodymium at low temperatures.

Still a third modification of these oxides exists at high temperatures. In this "C—$M_2O_3$" lattice, the oxygen ions are arranged approximately at the corners of a cube around the cation, but two are missing and the other four are at distances which necessarily adjust for this. Most rare earth oxides (together with the sesqui-oxides of manganese, niobium, tantalum and vanadium) form this lattice at high temperature.

It is possible then for cerium to co-ordinate six, seven or eight oxygen ions with approximately equal ease. By modifying the cerium oxide with $La_2O_3$ or $Nd_2O_3$ the average structure can be forced more nearly toward the six-fold coordination of the C—$M_2O_3$ lattice at high temperatures; by modifying it with silicate, phosphates, alumina, zirconia or thoria this structure can be made to approximate the fluorite form. Since there is little if any volume or phase change involved the resulting structure which is on its surface can absorb or release oxygen ions at will over a broad temperature range.

In an ordinary oxy-hydrogen flame the flame reactions depend upon chance collisions between atoms or ions with molecules and with each other:

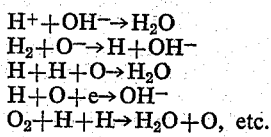

Of these reactions, since the only free ions capable of direct combination are hydrogen and hydroxyl it is necessary to have a simultaneous collision of three species or that atomic hydrogen or oxygen exists in relatively large quantities. The probability of collision of three particles is hundreds of times less than that for two and as a consequence atomic species tend to reform molecules:

and
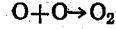

The solid surface of the oxidation catalyst, then, is simply one upon which atoms or ions of oxygen and hydrogen can be attached so that a single molecular species can react with them to form the combustion product— in this illustration, water.

Thus:
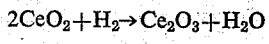
and
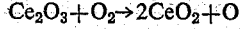

can equally occur, and the temperature range over which they occur can, by distorting the cerium oxide lattice with the other oxides named, be broadened from about 250° C. to the melting point of ceria (about 2600° C.).

In essence, then, the combustion catalyst is one which, by increasing the probability of contact between fuel and oxygen, decreases the temperature threshold of combustion and also increases the combustion rate.

Since the catalytic surface itself is necessarily heated by the reactions occurring on it, it should be refractory. For this reason, the rare earth oxides are preferred, but it is possible, and has been experimentally shown, that the coating may be applied by either of the following processes, one of which has already been mentioned.

*Flame Spraying.*—In this process a flame or other heat source is used which heats each particle to at least its sintering temperature prior to impingement on the coating surface. This process is preferred for the application of combustion catalyst coatings because the coating thus applied is naturally stressed in such a way that sudden heating acts to relieve these stresses. As a consequence, flame-sprayed ceramic coatings are highly resistant to thermal shock and to changes in pressure.

Furthermore, flame-spraying of two or more materials can be accomplished in the same torch. If the thermal conductivity of the coating is for any reason lower than is desired, it may be increased by including a suitable proportion of a conductive metal in the powder feed. It has been found that a mixture of approximately 10 percent by weight of finely powdered aluminum may be added to the rare-earth material; the resulting coating is approximately as conductive thermally as cast iron (about 50 B.t.u.° $F^{-1}$ $ft.^{-2}$ $hr.^{-1}$ per inch of thickness).

In addition, additives may be included which, though not able to be flame-sprayed themselves, are mechanically held in the sintered matrix. Examples of these are particles of extremely hard materials, such as chromium carbide, tungsten carbide, and the like, to resist abrasion. As an example, when 20 weight percent of chromium carbide is powdered to 150–200 mesh and mixed with the rare-earth oxide material, the resulting flame-sprayed coating is sufficiently resistant to abrasion to withstand ordinary sand-blasting from two to ten times as long as the rare-earth coating alone.

*Slurry coating.*—A second procedure for firmly attaching a ceramic catalyst coating to a solid material has been found to be applicable where the cost of flame-spraying cannot be borne or the coating need not be so refractory. An example of this is listed below.

A mixture is first made of the crystallize material or materials to be used as the catalyst. This may be the rare-earth oxide mixture described earlier, or such less refractory materials as gamma-alumina, manganese oxide, chromite, or the like. This material is preferably ground to an average particle size of from one to 50 microns, but smaller particles are sometimes desired.

To from 50 to 90 parts of this material are added 50 to 10 parts of an inorganic sol consisting of one or more of the following:

(1) Aluminum acid phosphate (50% by weight in water), (2) Silica sols, Na, K, $NH_4$, stabilized (1:3 to 1:300).

(3) Lanthanum, cerium, praseodymium, or neodymium acid phosphate (in proportions up to their maximum solubility in phosphoric acid).

(4) Mixtures of the above.

These binder sols are combined, with shaking, in the following preferred proportions:

At least 30 percent of the binder sol should be aluminum phosphate, not more than 50 percent of the binder sol should be potassium (or ammonium) silicate, and the remainder shoud be the rare earth phosphate sol.

The crystalline material and sol binder are thoroughly mixed together and diluted depending on the consistency required by brushing, spraying, or dipping.

After application to the previously prepared substrate surface, the coating is allowed to dry in air. It is then "cured" to from 160° C. to 475° C. depending upon the binder sol composition (lower temperatures for high proportion of silicate) and is then ready to use.

This coating, while not quite so hard nor so resistant to thermal shock as the flame-sprayed coatings, is more economically applied and is equally effective as a combustion catalyst. It can be used to temperatures of 1500° C. without serious change in its properties, and may therefore be used in preference to flame-sprayed coatings when:
(1) Economy is paramount,
(2) Surfaces to be coated cannot be reached by flame-spray,
(3) More porous coating is desired,
(4) Substrate cannot withstand sudden heat of flame.

It will be understood that modifications and variations may be effected without departing from the novel spirit or scope of the instant invention.

We claim as our invention:

1. A ceramic coating composition which upon deposition onto a substrate surface forms an oxidation catalyst consisting essentially of a particulate mixture of from 30 to substantially 100% cerium oxide, 0.01 to 20% neodymium oxide, and from 0.01 to 20% praseodymium oxide, said oxides being of a particle size ranging from 0.5 micron up to —60 mesh, and small quantities of a particulate flame catalyst selected from the group consisting of lanthanum oxide, scandium oxide, yttrium oxide and mixtures thereof.

2. A combustion chamber lined with a catalytic, crystalline, ceramic coating produced by the flame spraying of the composition of claim 1.

3. A piston for use in an internal combustion engine the head surface of which is coated with a catalytic, crystalline, ceramic coating produced by the flame spraying of the composition defined in claim 1.

4. The method of applying a catalytic refractory coating onto a surface which comprises injecting into a combustion zone the material defined by claim 1, maintaining the temperature and residence time of said particles of said mixture in said combustion zone at a value to heat such particles to their sintering temperatures, and impinging the hot particles on the surface to form a crystalline deposit of the resulting sintered particles as an adherent coating on said surface.

5. A catalytic member consisting essentially of a substrate member coated with the catalytic coating as formed by the process of claim 4.

6. A ceramic coating composition which upon deposition onto a substrate surface forms an oxidation catalyst consisting essentially of a particulate mixture of from 30 to substantially 100% cerium oxide, 0.01 to 20% neodymium oxide, and from 0.01 to 20% praseodymium oxide, said oxides being of a particle size ranging from 0.5 micron up to —60 mesh, and small quantities of particulate oxides which form solid solutions with such rare earth oxides selected from the class consisting of niobium oxide, tantalum oxide, vanadium oxide, and mixtures thereof.

7. A combustion chamber internally lined with a catalytic, crystalline coating produced by the flame spraying of the composition of claim 6.

8. A piston for use in an internal combustion engine the head surface of which is coated with a catalytic, crystalline, ceramic coating produced by the flame spraying of the composition defined in claim 6.

9. The method of applying a catalytic refractory coating onto a surface which comprises injecting into a combustion zone the material defined by claim 6, maintaining the temperature and residence time of said particles of said mixture in said combustion zone at a value to heat such particles to their sintering temperatures, and impinging the hot particles on the surface to form a crystalline deposit of the resulting sintered particles as an adherent coating on said surface.

10. A catalytic member consisting essentially of a substrate member coated with the catalytic coating as formed by the process of claim 9.

11. A ceramic coating composition which upon deposition onto a substrate surface forms an oxidation catalyst consisting essentially of a particulate mixture of from 30 to substantially 100% cerium oxide, 0.01 to 20% neodymium oxide, and from 0.01 to 20% praseodymium oxide, said oxides being of a particle size ranging from 0.5 micron up to —60 mesh, small quantities of a particulate flame catalyst selected from the group consisting of lanthanum oxide, scandium oxide, yttrium oxide and mixtures thereof, and small quantities of particulate oxides which form solid solutions with such rare earth oxides selected from the class consisting of niobium oxide, tantalum oxide, vanadium oxide, and mixtures thereof.

12. A combustion chamber internally lined with a catalytic, crystalline, ceramic coating produced by the flame spraying of the composition of claim 11.

13. A piston for use in an internal combustion engine the head surface of which is coated with a catalytic, crystalline, ceramic coating produced by the flame spraying of the composition defined in claim 11.

14. The method of applying a catalytic refractory coating onto a surface which comprises injecting into a combustion zone the material defined by claim 11, maintaining the temperature and residence time of said particles of said mixture in said combustion zone at a value to heat such particles to their sintering temperatures, and impinging the hot particles on the surface to form a crystalline deposit of the resulting sintered particles as an adherent coating on said surface.

15. A catalytic member consisting essentially of a substrate member coated with the catalytic coating as formed by the process of claim 14.

16. A ceramic coating composition which upon deposition onto a substrate surface forms an oxidation catalyst consisting of about 0.01% to about 20% neodymium oxide, about 0.01% to about 20% praseodymium oxide, and the balance essentially all cerium oxide, said oxides being of a particle size ranging from about 0.5 micron up to —60 mesh.

17. A combustion chamber internally lined with a catalytic, crystalline, ceramic coating produced by the flame spraying of the composition of claim 16.

18. A piston for use in an internal combustion engine, the head surface of which is coated with a catalytic, crystalline, ceramic coating produced by the flame spraying of the composition of claim 16.

19. The method of applying a catalytic refractory coating onto a surface which comprises injecting into a combustion zone the composition of claim 16, maintaining the temperature and residence time of said particles of said composition in said combustion zone at a value to heat such particles to their sintering temperatures, and impinging the hot particles on the surface to form a crystalline deposit of the resulting sintered particles as an adherent coating on said surface.

References Cited in the file of this patent

UNITED STATES PATENTS

| | | |
|---|---|---|
| 2,311,039 | Emery | Feb. 16, 1943 |
| 2,763,569 | Bradstreet | Sept. 18, 1956 |
| 2,904,449 | Bradstreet | Sept. 15, 1959 |